(12) United States Patent
Pandey et al.

(10) Patent No.: US 9,949,117 B2
(45) Date of Patent: Apr. 17, 2018

(54) METHOD AND APPARATUS FOR MANAGING ACCESS TO A WIRELESS COMMUNICATION NETWORK

(71) Applicant: AT&T Intellectual Property I, LP, Atlanta, GA (US)

(72) Inventors: Vinod Pandey, Eden Prairie, MN (US); Zhi Cui, Sugar Hill, GA (US); Liza Fung, Edison, NJ (US); Cheng Liu, Atlanta, GA (US); Paul Edward Smith, Jr., Rockwall, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 120 days.

(21) Appl. No.: 14/473,028

(22) Filed: Aug. 29, 2014

(65) Prior Publication Data

US 2016/0066207 A1    Mar. 3, 2016

(51) Int. Cl.
*H04W 12/06* (2009.01)
*H04W 76/00* (2018.01)
*H04W 4/00* (2018.01)
*H04W 76/02* (2009.01)

(52) U.S. Cl.
CPC .......... *H04W 12/06* (2013.01); *H04W 4/005* (2013.01); *H04W 76/00* (2013.01); *H04W 76/02* (2013.01)

(58) Field of Classification Search
None
See application file for complete search history.

(56) References Cited

U.S. PATENT DOCUMENTS

| 8,423,760 | B2 | 4/2013 | Kant et al. |
| 8,693,401 | B2 | 4/2014 | Lim et al. |
| 8,767,625 | B2 | 7/2014 | Krishnaswamy et al. |
| 2004/0082346 | A1* | 4/2004 | Skytt ............ H04W 24/02 455/456.3 |
| 2005/0177515 | A1* | 8/2005 | Kalavade ........... H04L 63/0853 705/52 |

(Continued)

FOREIGN PATENT DOCUMENTS

EP    2660766 A1 *  6/2013

OTHER PUBLICATIONS

Hsieh, Han-Chuan et al., "Congestion Control Optimization of M2M in LTE Networks", Advanced Communication Technology (ICACT), 2013 15th International Conference, Jan. 2013.

(Continued)

*Primary Examiner* — Jeffrey M Rutkowski
*Assistant Examiner* — Andre Tacdiran
(74) *Attorney, Agent, or Firm* — Guntin & Gust, PLC; Ralph Trementozzi

(57) ABSTRACT

Aspects of the subject disclosure may include, for example, a method including initiating, by a system comprising a processor, a third generation partnership project link between a mobile user equipment and a mobile management entity of a mobile packet core of a mobile communication network, initiating a non-tunneling link between stationary user equipment and a stationary packet core of the mobile communication network, and transmitting packet data from the stationary user equipment to a service through the stationary packet core via the non-tunneling link. Other embodiments are disclosed.

20 Claims, 8 Drawing Sheets

(56) References Cited

U.S. PATENT DOCUMENTS

| | | | |
|---|---|---|---|
| 2010/0099402 A1* | 4/2010 | Wu | H04W 76/027 455/423 |
| 2011/0110378 A1* | 5/2011 | Savolainen | H04W 76/025 370/400 |
| 2012/0128084 A1* | 5/2012 | Aguirre | H04W 72/048 375/260 |
| 2012/0213165 A1 | 8/2012 | Miklós et al. | |
| 2012/0287854 A1 | 11/2012 | Xie et al. | |
| 2013/0003576 A1 | 1/2013 | Segura et al. | |
| 2013/0017827 A1 | 1/2013 | Muhanna et al. | |
| 2013/0102310 A1* | 4/2013 | Carbo Malonda | H04L 63/107 455/435.1 |
| 2013/0208661 A1* | 8/2013 | Nylander | H04W 48/18 370/328 |
| 2013/0223399 A1 | 8/2013 | Lu et al. | |
| 2013/0291100 A1 | 10/2013 | Ganapathy et al. | |
| 2013/0301540 A1* | 11/2013 | Draznin | H04W 76/022 370/329 |
| 2013/0324114 A1* | 12/2013 | Raghothaman | H04W 76/023 455/426.1 |
| 2014/0036793 A1 | 2/2014 | Johnsson et al. | |
| 2014/0177583 A1* | 6/2014 | Aso | H04W 4/005 370/329 |
| 2014/0189001 A1 | 7/2014 | Tyagi et al. | |
| 2014/0192780 A1* | 7/2014 | Kim | H04W 48/08 370/331 |
| 2014/0233384 A1* | 8/2014 | Howard | H04W 28/0289 370/235 |
| 2014/0310523 A1* | 10/2014 | Zhang | H04W 12/10 713/168 |
| 2015/0189637 A1* | 7/2015 | Zhou | H04W 76/045 370/231 |
| 2015/0230115 A1* | 8/2015 | Forgeat | H04W 60/02 370/252 |
| 2015/0334597 A1* | 11/2015 | Peisa | H04W 28/08 370/235 |

OTHER PUBLICATIONS

Nikaein, Navid et al., "Latency for real-time machine-to-machine communication in LTE-based system architecture", Wireless Conference 2011—Sustainable Wireless Technologies (European Wireless), 11th European. VDE, 2011.

* cited by examiner

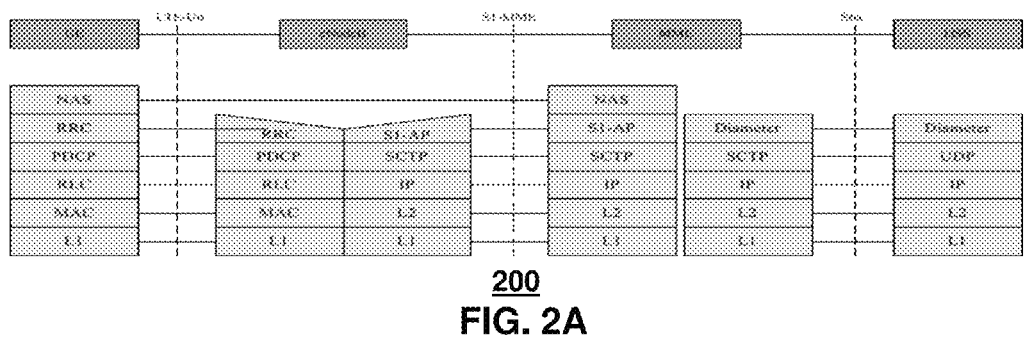
FIG. 2A — UE to HSS Authentication — 200
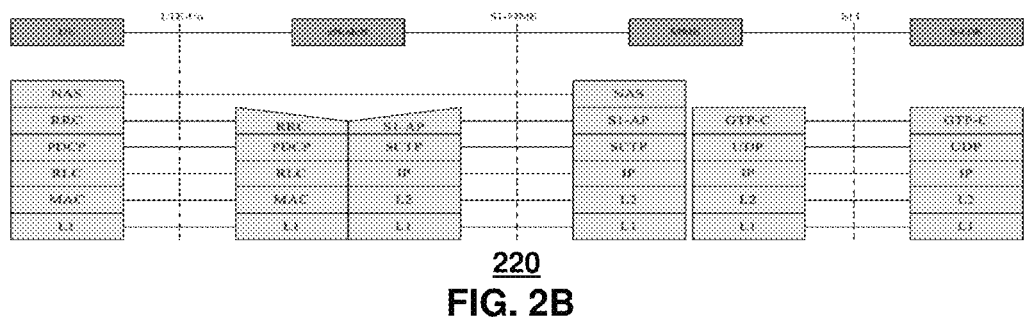
FIG. 2B — UE to MPC Control Plane — 220
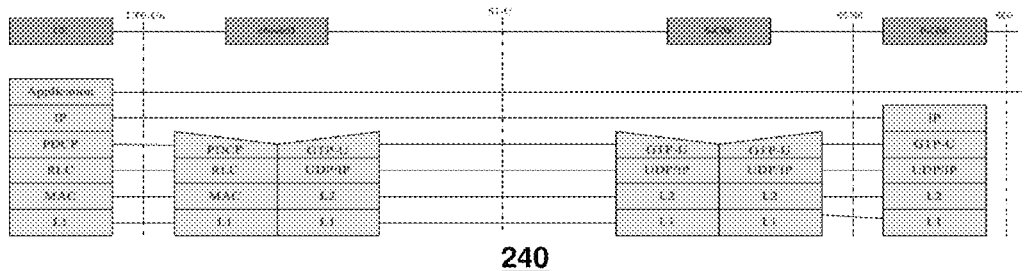
FIG. 2C — UE to MPC User Plane — 240

Machine UE to HSS Authentication

260

Machine UE to M2M MPC Control/User Plane

280

300

METHOD AND APPARATUS FOR MANAGING ACCESS TO A WIRELESS COMMUNICATION NETWORK

FIELD OF THE DISCLOSURE

The subject disclosure relates to a method and apparatus for managing access to a wireless communication network.

BACKGROUND

Communication systems, such as a mobile communications system, can be used for providing various services, including voice, video and/or data services, and user location information can be important for next generation IP multi-media services provided by telecommunication systems As the number of users and their service requirements increase, the load on the network increases. Infrastructure expansion and improvement can lessen the network load but is costly.

BRIEF DESCRIPTION OF THE DRAWINGS

Reference will now be made to the accompanying drawings, which are not necessarily drawn to scale, and wherein:

FIGS. 2A-2E depict illustrative embodiments of protocol stacks for a system for providing communication services for mobile and stationary devices in a mobile communication network;

DETAILED DESCRIPTION

Figure 1:
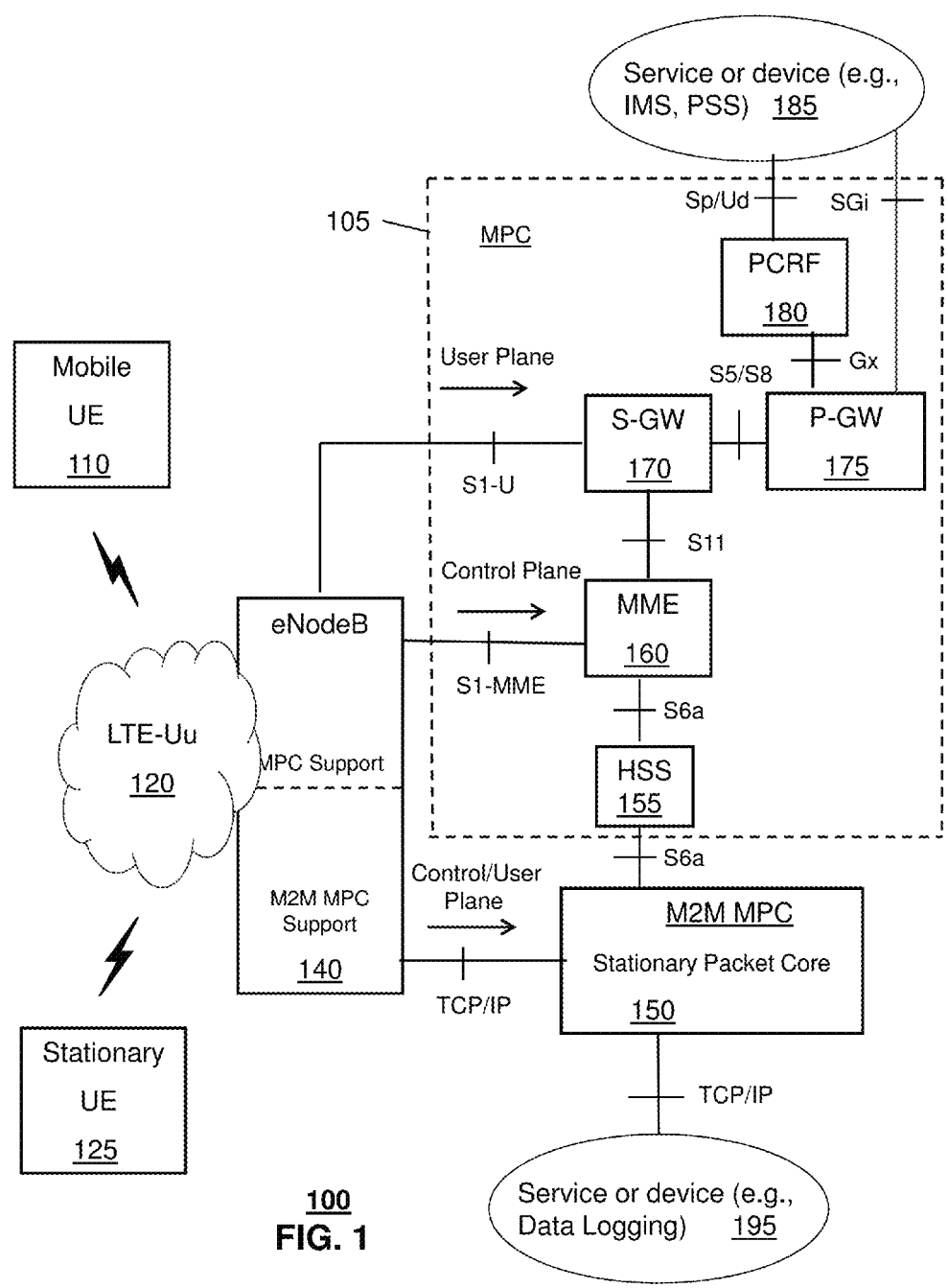
FIG. 1 depicts illustrative embodiments of a system for providing communication services for mobile and stationary devices in a mobile communication network.

The subject disclosure describes, among other things, illustrative embodiments for a method and system for providing access to a wireless communication network. The exemplary embodiments manage access by mobile and stationary User Equipment (UE) devices to a mobile packet core of a Long Term Evolution (LTE) network. The mobile and stationary UE devices can communicate with the mobile network by wireless radio communications with an Evolved Node B (eNodeB), which can enable distinctly different links to the Mobile Packet Core (MPC) network for mobile and stationary UE devices.

When a UE device contacts the eNodeB by wireless radio communication, the eNodeB can determine whether the UE device is a mobile device, such as a cellular phone or mobile smart device, or whether the UE device is a stationary device, such as a fixed location machine that is coupled to a wireless transmitter. If the UE device is a mobile device, then the eNodeB can perform operations for initiating communications, authenticating the UE device, and/or assigning bearer paths according to third generation partner project (3GPP) standards. In one embodiment, according to the 3GPP standards, the eNode B can contact a Mobile Management Entity, via a tunnel protocol, can attach and authenticate the mobile UE device to the MPC network, can assign bearer gateways for user plane communications, and can perform mobility management for the mobile UE device. If the UE device is a stationary UE device, then the eNodeB can contact a Machine-to-Machine Mobile Packet Core (M2M MPC) via a non-tunneling protocol to authenticate the stationary UE device and to transmit data between the stationary UE device and a service. Other embodiments are described in the subject disclosure.

One embodiment of the subject disclosure includes a communication device comprising a memory to store executable instructions and a processor. The processor, responsive to executing the executable instructions, can perform operations including receiving connection request from user equipment via wireless link to the user equipment and, in turn, determining whether the user equipment is mobile or stationary. Responsive to determining that the user equipment is mobile, the processor can also perform operations comprising initiating a tunneling protocol link between the user equipment and a mobile management entity of a mobile packet core of a mobile communication network. The mobile management entity can assign a bearer gateway for the user equipment. The processor can also perform operations comprising transmitting first packet data from the user equipment to a first service through the bearer gateway via the tunneling protocol link. Responsive to determining that the user equipment is stationary, the processor can further perform operations comprising initiating a non-tunneling link between the user equipment and a stationary packet core of the mobile communication network and, in turn, transmitting second packet data from the user equipment to a second service through the stationary packet core via the non-tunneling link.

One embodiment of the subject disclosure includes a computer-readable storage device, comprising executable instructions. The executable instructions can cause a processor to perform operations comprising initiating a tunneling protocol link between a mobile user equipment and a mobile management entity of a mobile packet core of a mobile communication network. The mobile management entity can assign a bearer gateway for the mobile user equipment. The executable instructions can further cause the processor to perform operations comprising determining second user equipment is stationary. Responsive to determining that the second user equipment is stationary, the executable instructions can also cause the processor to perform operations comprising initiating a TCP/IP link between the second user equipment and a stationary packet core of the mobile communication network and, in turn, transmitting packet data from the second user equipment to a service through the stationary packet core via the TCP/IP link.

One embodiment of the subject disclosure includes a method including initiating, by a system comprising a processor, a third generation partnership project link between a mobile user equipment and a mobile management entity of a mobile packet core of a mobile communication network. The method can also include initiating, by the system, a non-tunneling link between stationary user equipment and a stationary packet core of the mobile communication network. The method can further include transmitting, by the system, packet data from the stationary user equipment to a service through the stationary packet core via the non-tunneling link.

In FIG. 1, a mobile communication system 100 is illustrated that can provide wireless communication services, including voice, video and/or data services to mobile UE devices 110 and stationary UE devices 125. System 100 can enable wireless communication services over a number of different networks, such as between User Equipment (UE) device 110 and other communication devices and/or services 185 and 195. Mobile UE devices 110 are movable from location to location, while remaining wirelessly connected to the system 100 via various wireless communication assets of the system 100. Stationary UE devices 125 remain in fixed locations with respect to the wireless communication assets of the system 100 so that, effectively, the stationary UE devices 125 rely on specific wireless communication assets of the system 100. Mobile UE devices 110 can include a number of different types of devices that are capable of voice, video and/or data communications, including cellular phones, smartphone, a personal computer, media processing devices, and so forth. Stationary UE devices 125 can be fixed location machines with wireless communication capabilities, such as vending machines, utility meters, and monitoring devices that can advantageously communicate through the wireless capabilities of the system 100.

In one or more embodiments, in addition to the mobile UE device 110 and the stationary UE device 125, the system can include a Long-Term Evolution (LTE) Radio Access Technology (RAT) network (LTE-Uu network) 120, such as an Evolved UMTS Terrestrial Radio Access Network (E-UTRAN), a Universal Mobile Telecommunications System (UMTS), a Global System for Communications (GSM) network, an Evolution Data Only (EVDO) network, or a Code Division Multiple Access (CDMA) network. The LTE-Uu network 120 provides radio communication assets for wireless connectivity between the UE devices 110 and 125 and the Mobile Packet Core (MPC) 105 of the system 100. The LTE-Uu network 120 can also enable connectivity between the end user devices 110 and 125 and the MPC 105. The LTE-Uu network 120 can utilize a number of interfaces, including Iu, Uu, Iub and/or Iur.

In one or more embodiments, the LTE-Uu network 120 can be coupled to an eNodeB 140 and can carry many traffic types including IP-based packet switched traffic. In one or more embodiments. An E-UTRAN-based LTE-Uu 120 can include one or more eNodeB nodes on the network that are connected to each other such as via X2 interfaces and which are further connectable to the MPC network 105 via an S1-U interface. For example, E-UTRAN-based LTE-Uu 120 can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, an eNodeB 140 can include an air interface to the LTE-Uu network 120 and network interfaces to the MPC 105 and to a stationary packet core 150 (Machine-to-Machine Mobile Packet Core or M2M MPC). The air interface can support an E-UTRAN-based LTE-Uu network 120, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface can enable the eNodeB 140 to receive requests for connection to the system 100 from various types of UE devices, including mobile UE devices 110 and stationary UE devices 125. In one or more embodiments, the network interfaces of the eNodeB 140 can support communication to the MPC 105 or the stationary packet core 150.

In one or more embodiments, the eNodeB 140 can receive a connection request from a mobile UE device 110 or a stationary UE device 125. The eNodeB 140 can determine whether the requesting UE device 110 or 125 is mobile or stationary. In one embodiment, the eNodeB 140 can determine from an address of the UE device 110 or 125 whether the UE device 110 or 125 is a stationary device which will be supported. In one embodiment, the eNodeB 140 can be provided with one or more addresses of stationary UE devices 125 that are located in an area supported by the eNodeB 140. In one embodiment, when a support contract is created for a particular stationary UE device 125, an address for the stationary UE device 125 can be loaded into an eNodeB 140 that is local to the stationary UE device 125. In one embodiment, the eNodeB can query the MPC system 105 for addresses of local stationary UE devices 125. In one embodiment, the requesting UE device 110 or 125 can include address information with a connection request. The eNodeB 140 can compare this address information to one or more addresses for stationary UE devices 125 for which a service plan has been contracted. In one or more embodiments, after the eNodeB 140 has determined whether the requesting device is a mobile UE device 110 or a stationary UE device 125, the eNodeB 140 can process the requesting using either the mobile packet core 105 or the stationary packet core 150.

In one or more embodiments, if the eNodeB 140 determines that the requesting device is a mobile UE device 110, then the eNodeB 140 can perform operations consistent with the 3GPP standard. In one or more embodiments, the eNodeB 140 can request authentication for the mobile UE device 110. In one embodiment, the eNodeB 140 can forward a connection request from the mobile UE device 110 to the MME 160. Illustrative embodiments of protocol stacks for use in authenticating mobile UE devices 110 consistent with the 3GPP standard are depicted in FIG. 2A. An authentication request can be completed as a control plan function for the mobile UE device 110. The authentication request can be flow from the mobile UE 110 to the MME 160 via a Non-Access Stratum (NAS) protocol message. The NAS protocol extends from the mobile UE device 110 to the MME 160. The eNodeB 140 allows the NAS protocol authentication request to flow directly from the mobile UE device 110 to the MME 160, via a tunneling protocol (GTP) link between eNodeB 140 and the MME 160. At the MME 160, however, authentication request can be converted to an Internet Engineering Task Force (IETF) standard authentication message protocol, such as the Diameter protocol. The converted, authentication message in the Diameter protocol can be forwarded to the Home Subscription Service (HSS) server 155 for verification of the authentication request for the mobile UE device 110. Hence, the eNodeB 140 can merely forward an authentication request from a mobile UE device 110, whereas the MME 160 can be tasked to convert the authentication request before sending the request to the HSS server 155 and re-convert the results returned from the HSS server 155. The MME 160 can handle conversion to the authentication request and interfacing to the HSS server 155 via a tunneling protocol. In one embodiment, when a mobile UE device 110 is booted up, the mobile UE device 110 can send the authentication request to the MME 160 via eNodeB 140.

In one or more embodiments consistent with the 3GPP standard, the Home Subscriber Server (HSS) 155 can be provide a central database that contains user-related and subscription-related information. The functions of the HSS 155 include functionalities such as mobility management, call and session establishment support, user authentication and access authorization. In one embodiment, the HSS 155 can manage subscription-related information in real time, for multi-access and multi-domain offerings in an all-IP environment. The HSS 155 can be based on Home Location Register (HLR) and Authentication Center (AuC).

In one or more embodiments consistent with the 3GPP standard, where the HSS 155 returns a successful authentication of the mobile UE device 110, the MME 160 can perform additional control plane functions for the benefit of the mobile UE device 110. Illustrative embodiments of protocol stacks for use in the control plane functions of the mobile UE devices 110 are depicted in FIG. 2B. In one embodiment, the MME 160 can assign one or more bearer gateways 170 and 175 for use in transporting user data to and from the mobile UE device 110. For example, the MME 160 can assign one or more default bearer gateways 170 and 175 and/or one or more dedicated bearer gateways 170 and 175. In one embodiment, a default bearer gateway 170 and 175 can provide a default pathway for control and signal messages between the mobile UE device 110 and the MPC related to operation of the mobile UE device 110 and the MPC 105. In one embodiment, a dedicated bearer gateway 170 and 175 can provide a pathway for critical signals, such as voice over internet (VoIP), where a guaranteed quality of service (QOS) must be provided. Hence, the MME 160 can perform assignment, creation, deletion, and/or maintenance of bearer gateways 170 and 175 for the mobile UE device 110.

In one or more embodiments consistent with the 3GPP standard, after the MME 160 has performed assignment of bearer gateways 170 and 175 for the mobile UE device 110, the MME 160 can further perform updates and handovers on behalf of the mobile UE device 110 as the mobile UE device 110 moves between various LTE-Uu wireless network 120 locations. The MME 160 can assign initial bearer gateways 170 and 175 for the mobile UE device 110 based on location information and QoS information associated with the mobile UE device 110. However, if the mobile UE device 110 moves to a different location, or if the mobile UE device 110 acquires a different QoS requirement, then the MME 160 can be required to update the assignment of the bearer gateways 170 and 175 to fulfill performance requirements. Hence, the MME 160 can assign and maintain bearer pathways for user data for the mobile UE device 110. In one or more embodiments, the eNodeB 140 supports a tunneling protocol pathway for authentication, control plane, and user plane for the mobile UE device 110. Illustrative embodiments of protocol stacks for use in the user plane functions of the mobile UE devices 110 are depicted in FIG. 2C.

In one or more embodiments consistent with the 3GPP standard, the MME 160 can perform functions such as idle mode tracking and paging procedure including retransmissions. The MME 160 can also choose a serving gateway for the end user device 110 such as at the initial attach and at time of intra-LTE handover involving node relocation. MME 160 and HHS 155 can be accessed when the end-user device 110 attempts to re-register to user E-UTRAN 120 to access the core network 105. In one embodiment, after the eNodeB 140 and the MME 160 have established a tunneling link for the mobile UE device 110, the session can be maintained indefinitely.

In one or more embodiments according to the 3GPP standard, a Serving Gateway (S-GW) 170 can route and forward user data packets, while also acting as the mobility anchor for the user plane during inter-eNodeB handovers and as the anchor for mobility between LTE and other 3GPP technologies (e.g., terminating S4 interface and relaying the traffic between 2G/3G systems and P-GW 175). For a mobile UE device 110 in idle state, the S-GW 170 can terminate a downlink data path and can trigger paging when downlink data arrives for the mobile UE device 110. The S-GW 170 can manage and can store mobile UE device 110 contexts, such as parameters of an IP bearer service and/or network internal routing information.

In one or more embodiments consistent with the 3GPP standard, a PDN Gateway (P-GW) 175 can provide connectivity from the mobile UE device 110 to external packet data networks by being the point of exit and entry of traffic for the mobile UE device 110. The mobile UE device 110 can have simultaneous connectivity with more than one P-GW 175 for accessing multiple PDNs. The P-GW 175 can perform policy enforcement, packet filtering for each user, charging support, lawful interception and/or packet screening. The P-GW 175 can also act as the anchor for mobility between 3GPP and non-3GPP technologies such as WiMAX and 3GPP2 (CDMA 1× and EvDO).

In one or more embodiments consistent with the 3GPP standard, a Policy Control Resource Function (PCRF) 180 can be provided. For example, the PCRF 180 can be a software node designated in real-time to determine policy rules. As a policy tool, the PCRF 180 can operate at the network core and can access subscriber databases and other specialized functions, such as a charging system, in a centralized manner. The PCRF 180 can aggregate information to and from the network, operational support systems, and other sources (such as portals) in real time, supporting the creation of rules and then automatically making policy decisions for each subscriber active on the network. The PCRF 180 can provide a network agnostic solution (e.g., wire line and/or wireless) and can be integrated with different platforms like billing, rating, charging, and subscriber database or can also be deployed as a standalone entity. The functions performed by the PCRF 180 can be any variety of functions, such as computer implemented steps in a process or algorithm associated with operation of a mobile communications network.

Figure 2D:
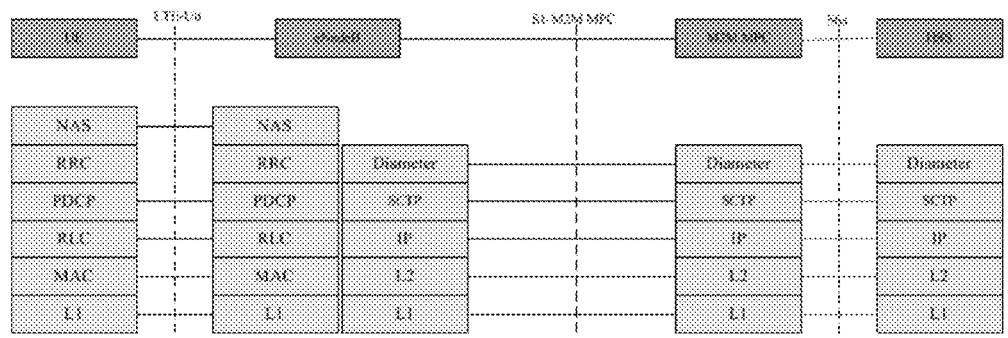

In one or more embodiments, if the eNodeB 140 determines that the connection/authentication request has come from a stationary UE device 125, then the eNodeB 140 can establish a non-tunneling protocol session with the stationary packet core 150 (M2M MPC). In one embodiment, the eNodeB 140 can receive a connection/authentication request from the stationary UE device 125. Illustrative embodiments of protocol stacks for use in the authentication of the stationary UE device 110 are depicted in FIG. 2D. In one embodiment, the eNodeB 140 can convert the authentication request from the NAS protocol to the IETF authentication protocol message using the Diameter protocol. The Diameter authentication message can then be forwarded from the eNodeB 140 to the stationary packet core 150. In one embodiment, the stationary packet core 150 can forward the Diameter authentication message to the HSS 155 for verification of the stationary UE device 125. Hence, the eNodeB 140 can simplify requirements for the stationary packet core 150 by eliminating the need for the stationary packet core 150 to perform the authentication protocol conversion as is performed at the MME 160.

Figure 2E:
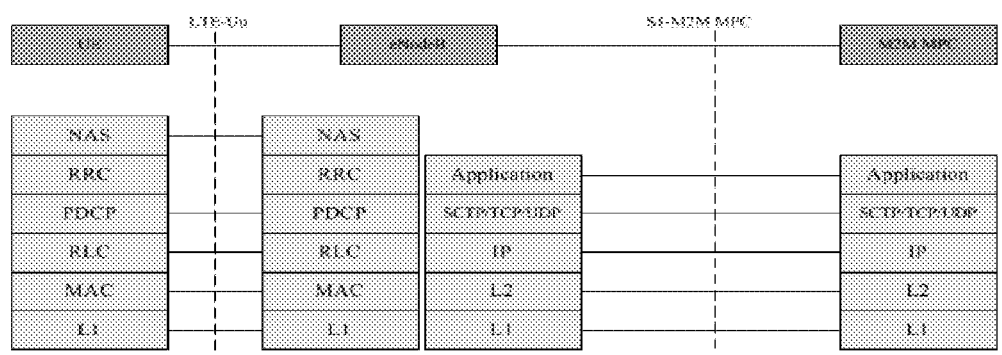

In one or more embodiments, if the HSS 155 authenticates the stationary UE device 125, the HSS 155 can return the authentication to the eNodeB 140 via the stationary packet core 150. In one embodiment, the eNodeB 140 can initiate a packet session between the stationary UE device 125 and a service or device 195 accessible via the stationary packet core 150. For example, data can be uploaded from the stationary UE device 125 to a data logging service 195 upon demand from the stationary UE device 125. The stationary UE device 125 can wirelessly upload data to eNodeB 140, which can forward the data over a non-tunneling protocol link between eNodeB 140 and the stationary packet core 150. The stationary packet core 150 further forwards the packet data to the logging service 195 via a non-tunneling protocol. Illustrative embodiments of protocol stacks for use in the control and user planes of the stationary UE device 110 are depicted in FIG. 2E. In one embodiment, the protocol stack of the eNodeB 140, the stationary packet core 150, and the logging service 195 can match, which can simplify requirements for the stationary packet core 150. In one or more embodiments, the non-tunneling protocol from eNodeB 140 through the stationary packet core 150 and the HSS 155 or the logging service 195 can be an Internet Protocol, such as TCP/IP.

In one or more embodiments, the stationary quality of the stationary UE device 125 can allow the eNodeB 140 and the stationary packet core 150 to provide a simplified, temporary, fixed-location data link for wireless uploading of data between the stationary UE device 125 and the logging service 195 (or other device/service). In one embodiment, the stationary UE device 125 can be assigned to a particular eNodeB 140 and stationary packet core 150. In one embodiment, the fact that the stationary UE device 125 is not subject to movement between LTE-Uu networks 120 can allow for the mobility tracking and updating functions of the comparable MME 160 to be eliminated in the stationary packet core 150. In one embodiment, stationary UE devices 125 can typically perform periodic uploading of data, where the QoS requirements are far less than for applications such as VoIP. Therefore, the stationary packet core 150 can eliminate functions for assigning dedicated bearer gateways 170 and 175 based on QoS issues. Finally, by performing conversion of the authentication request at the eNodeB 140, the stationary packet core 150 can be further simplified. Hence, in one or more embodiments, the combination of an eNodeB 140 that can support two types of UE devices—mobile and stationary—and two schemes for packet core communications—mobile and stationary—can allow for an integration of a fully capable MPC 105 for providing highest quality mobile wireless communication services with an efficient and inexpensive static packet core 150 for providing inexpensive stationary wireless communication services.

The architecture of the MPC 105 is designed to satisfy maximal requirements for QoS, bandwidth, mobility, loading, and handover. The stationary UE devices 125 typically do not require special QoS or large bandwidth. Rather, the QoS and bandwidth requirements are typically small, such that best effort service is sufficient without special policy management or PCRF. Examples of stationary UE devices 125 can include, but is not limited to, meter reading devices for water, gas, electric, and other utilities, vending machines, and non-camera monitoring devices. By replacing GTP tunneling with TCP/IP interfacing, off-the-shelf hardware can be used in the signal path.

Figure 3:
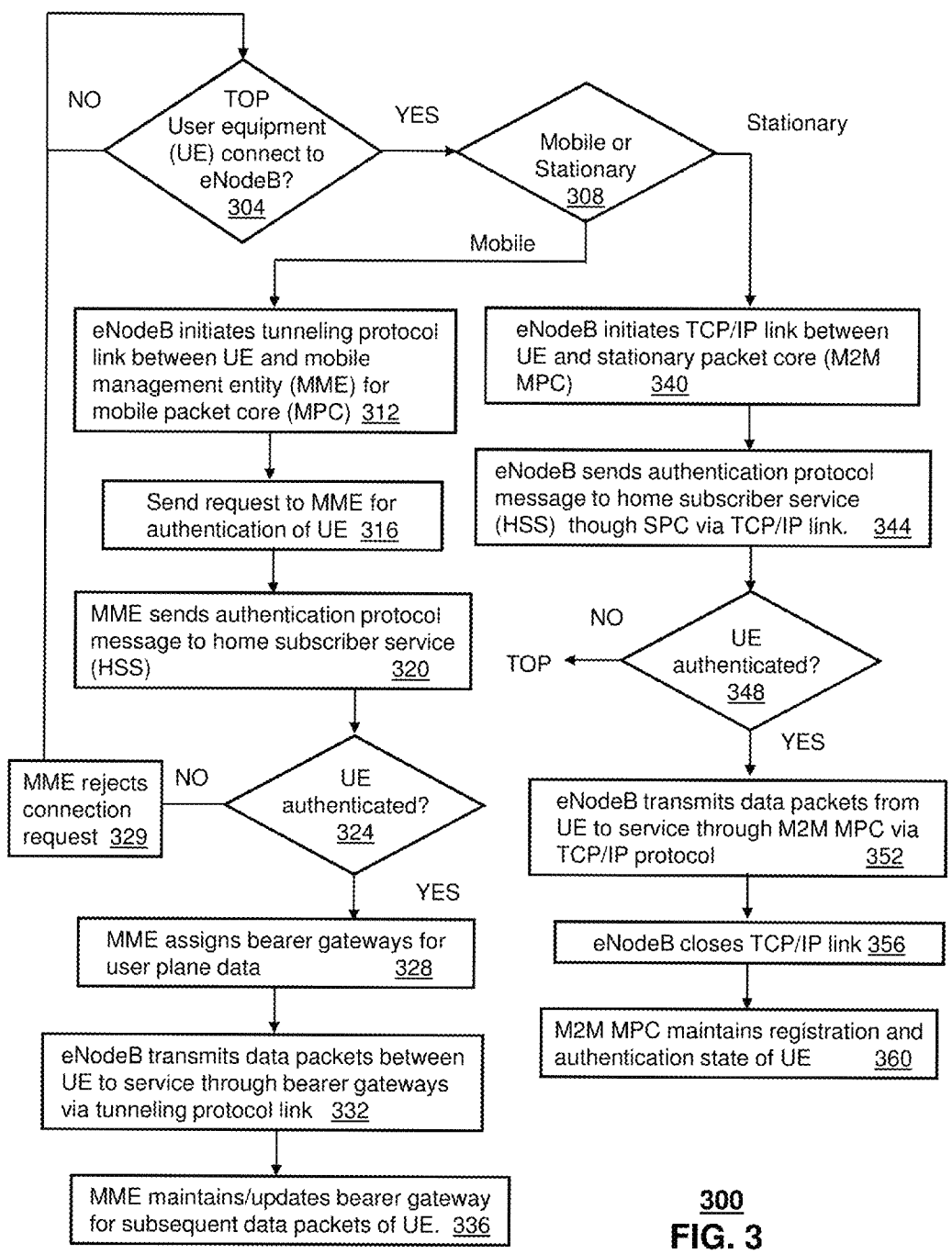
FIG. 3 depicts illustrative embodiments of a method used in portions of the system described in FIGS. 1 and 4-5.

FIG. 3 depicts an illustrative embodiment of a method 300 for providing wireless communication services to mobile and stationary UE devices 110 and 125 using the system 100 of FIG. 1. In one or more embodiments, at step 304, an eNodeB 140 can monitor for a connection by an UE device 110 or 125 via a LTE-Uu radio communication network. If the UE device 110 or 125 connects to the eNodeB 140, then, in step 308, the eNodeB can determine the type of UE device 110 or 125 that has connected, whether the UE device is a mobile UE device 110 or a stationary UE device 125. In one embodiment, the connection request to the eNodeB 140 can include identifying information, such as an address associated with a stationary device 125. The eNodeB 140 can use this identifying information to determine the type of the UE device (mobile or stationary).

In one or more embodiments, if the UE device is determined to be a mobile UE device 110, then the method can process the mobile connection request consistent with the 3GPP standard according to steps 312-336. In one or more embodiments consistent with the 3GPP standard, if the UE device is determined to be a stationary UE device 125, then the method can process the stationary connection request according to steps 340-360. In one or more embodiments, at step 312, eNodeB 140 can initiate a tunneling protocol link between the mobile UE device and a MME 160 for a MPC 105. In various embodiments, the tunneling protocol link can be used for authentication, control plane, and user plane communications. In one or more embodiments, at steps 316-324, eNodeB can send a request to the MME 160 for authentication of the mobile UE device 110. In one embodiment, eNodeB 140 can send a NAS protocol request to the MME 160 at step 316, reflective to the NAS protocol of the mobile UE device 110. The MME 160 can then convert the NAS protocol request to an authentication protocol message, send this message to the HSS 155 at step 320, and wait for authentication of the mobile UE device 110 at step 324. If authentication of the UE device 125 fails, then the MME 160 can reject the connection request for the UE device 125 at step 329 and wait for another connection request from any device at step 304.

If the authentication of the UE device 125 is successful, then in one or more embodiments, consistent with the 3GPP standard, at step 328, the MME 160 can perform control plane functions for assigning bearer gateways 170 and 175 for use a default and dedicated paths for control and data flow. In various embodiments, the MME 160 can account for QoS requirements to create, select, assign and/or modify bearer gateways. At step 332, eNodeB 140 and the bearer gateway paths that have been assigned in the MPC 105 can perform user plane functions for transmitting packet data between the mobile EU device 110 and a device or service 185 that is accessible via the MPC 105. At step 336, the MME 160 can perform control plane functions for maintaining and/or updating the bearer gateway paths 170 and 175 based on current location information for the mobile UE device 110.

In one or more embodiments, if the UE device is determined to be a stationary device 125, then, at step 340, eNodeB 140 can initiate a non-tunneling protocol connection between the stationary UE device 125 and the stationary packet core 150. In one embodiment, the non-tunneling protocol can be a TCP/IP type of communication link. In one or more embodiments, at steps 334 and 348, the eNodeB can send an authentication protocol message to the stationary packet core 150. In one embodiment, eNodeB 140 can convert the connection request from the stationary UE device 125 into the authentication protocol message. At step 348, eNodeB 140 can determine if the authentication has been successful. In one or more embodiments, at step 352, the eNodeB 140 can transmit data packets from the stationary UE 125 to a service or device 195 via the static packet core 150. At step 356, in one embodiment, the eNodeB 140 can close the non-tunneling protocol session, while, at step 360, the stationary packet core 150 can store registration and/or authentication information for the stationary UE device.

Figure 4:
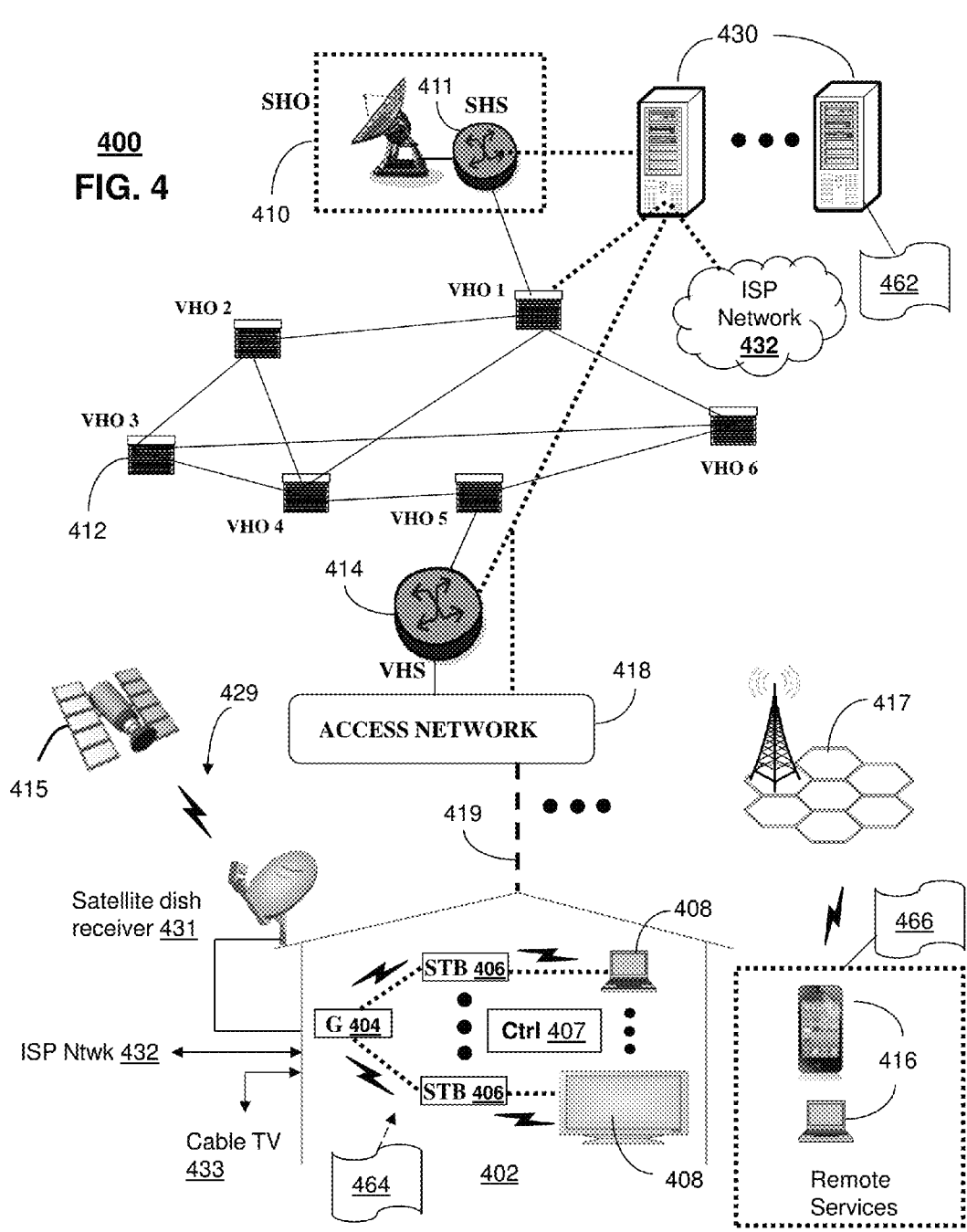
FIGS. 4-5 depict illustrative embodiments of communication systems that provide communication and media services for communication devices according to embodiments illustrated in FIG. 1.

FIG. 4 depicts an illustrative embodiment of a first communication system 400 for delivering media content. The communication system 400 can represent an Internet Protocol Television (IPTV) media system. Communication system 400 can be overlaid or operably coupled with system 100 of FIG. 1 as another representative embodiment of communication system 400. Communication system 400 can be used with a method 300 for providing wireless communications for mobile UE devices 110 and stationary UE devices 125, where that mobile or stationary status of the communication device 110 or 125 is determined and, in turn, the device is authorized and operated using one of a mobile packet core 105 or a stationary packet core 150. For instance, one or more devices illustrated in the communication system 400 of FIG. 4 can be used as a mobile UE device 110, as stationary UE device 125, an eNodeB 140, a MME 160, a stationary packet core 150, bearer gateway 170 and 175, a component of an LTE-Uu network 120, and/or a o process or service 185, 195 accessible to the MPC and/or the stationary packet core 150.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a communications server 430 herein referred to as server 430. The server 430 can use computing and communication technology to perform function 462 which can include among other things, providing communication connectivity between UE devices 110 and 125 in a telecommunication server that is described by method 300 of FIG. 3. For instance, function 462 of server 430 can be similar to the functions described for eNodeB 140, the MME 160, and/or the stationary packet core 150 of FIG. 1 in accordance with method 300 of FIG. 3. The media processors 406 and wireless communication devices 416 can be provisioned with software functions 464 and 466, respectively, to utilize the services of server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
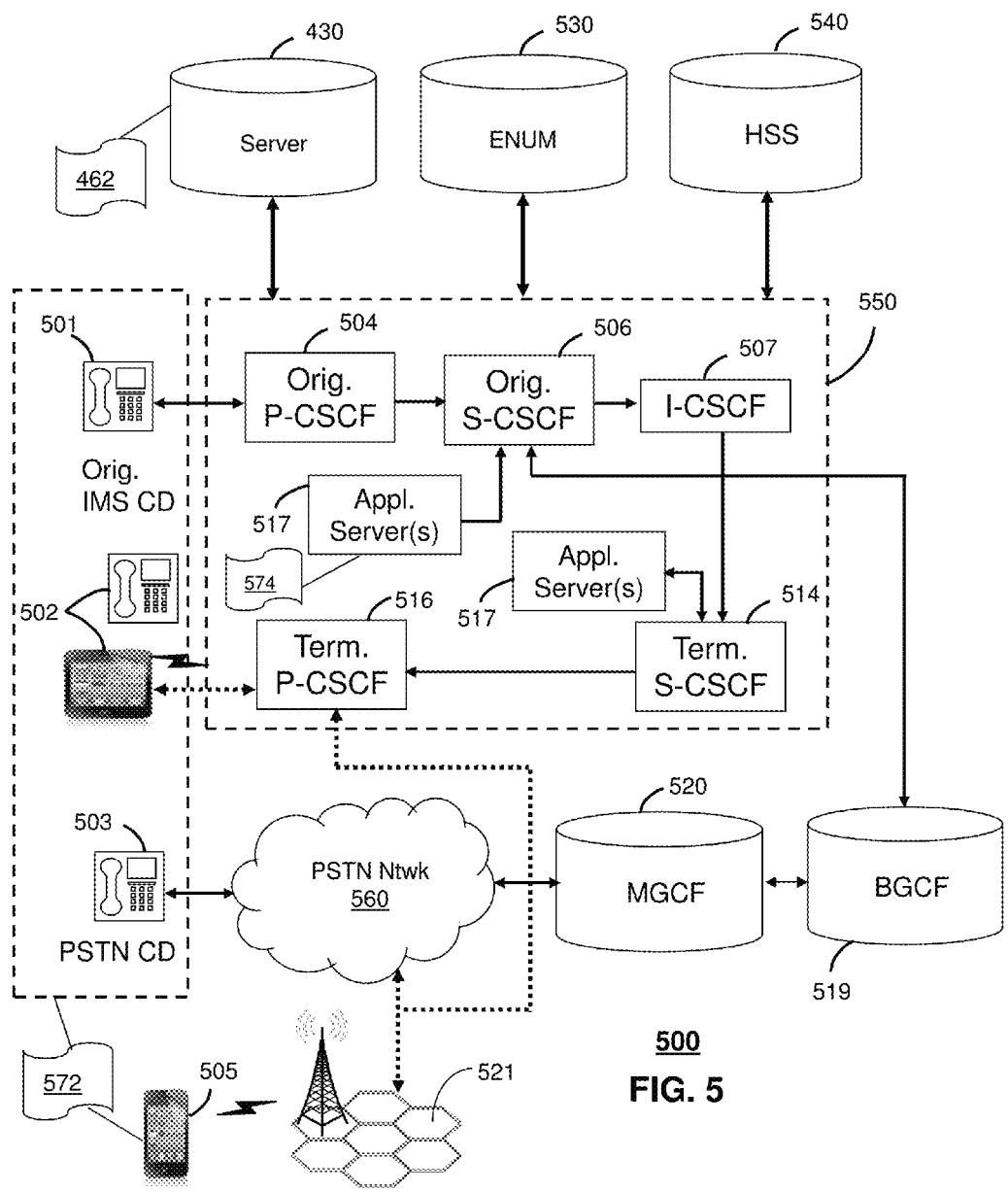

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid and/or operably coupled with system 100 of FIG. 1 and/or communication system 400 of FIG. 4 as another representative embodiment of communication systems 100 and/or 400. Communication system 500 can be used with a method 300 for providing wireless communications for mobile UE devices 110 and stationary UE devices 125, where that mobile or stationary status of the communication device 110 or 125 is determined and, in turn, the device is authorized and operated using one of a mobile packet core 105 or a stationary packet core 150. Devices depicted in FIG. 5can be used as mobile UE device 110, stationary UE device 125, eNodeB 140, MME 160, stationary packet core 150, bearer gateway 170 and 175, and/or LTE-Uu network 120, and/or can be processes or service 185, 195 accessible to the MPC and/or the stationary packet core 150.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can perform function 462 and thereby provide wireless communications services to the CDs 501, 502, 503 and 505 of FIG. 5 similar to the functions described for server 430 of FIG. X in accordance with method 300 of FIG. 3. CDs 501, 502, 503 and 505, which can be adapted with software to perform function 572 to utilize the services of the server 430 similar to the functions described for communication devices 416 of FIG. 4 in accordance with method 300 of FIG. 3. Server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
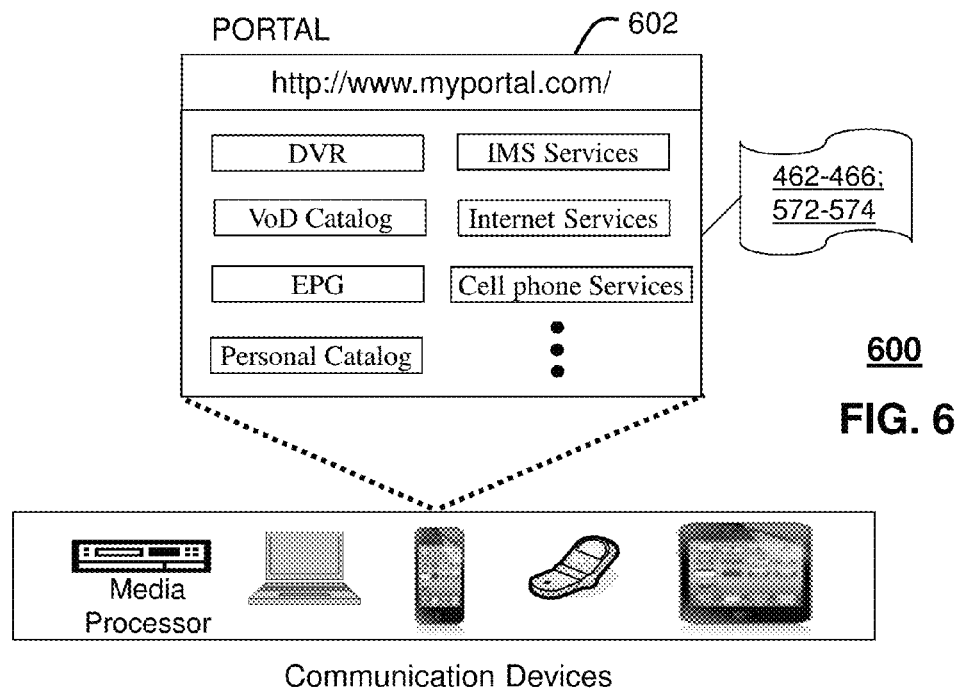
FIG. 6 depicts an illustrative embodiment of a web portal for interacting with the communication systems of FIGS. 1 and 4-5.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of system 100 of FIG. 1, and communication systems 400-500. For instance, users of the services provided by server 430 can log into their on-line accounts and provision the server 430 with a user or machine profile or an identifier associated with a mobile UE device 110 or a stationary UE device 125, to enable the server 430 to perform operations using devices described in FIGS. 1, 4, and 5. Service providers can log onto an administrator account to provision, monitor and/or maintain the user or machine profile or the identifier of systems 100 of FIG. 1 and/or systems 400 and 500 of FIGS. 4-5.

Figure 7:
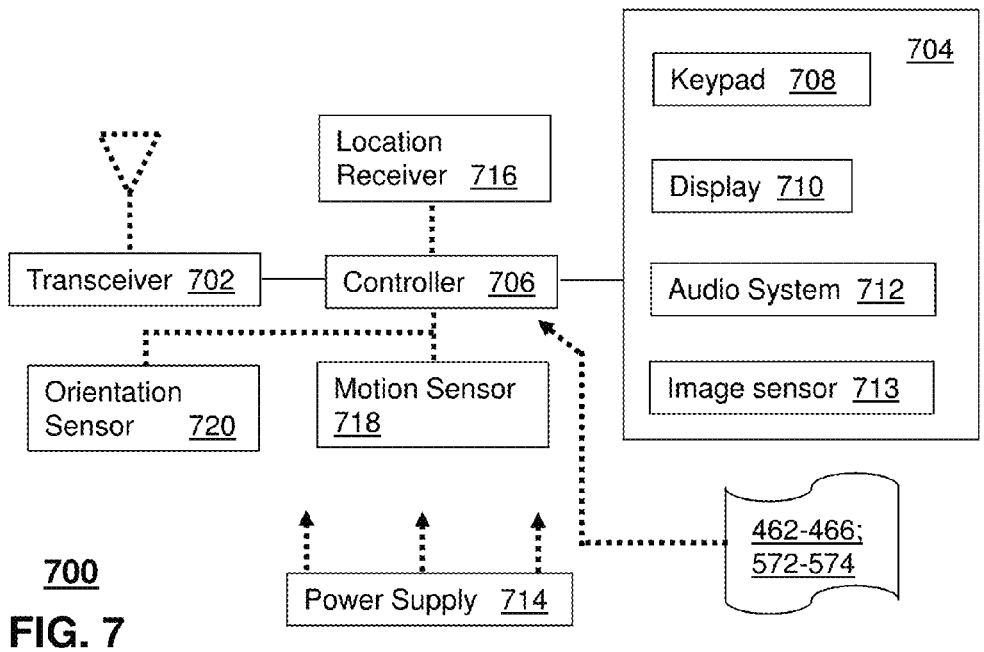
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and 4-5. Communication device 700 in whole or in part can represent any of the communication devices described in FIGS. 1 and 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1, 4, and 5, and can be used with a method 300 for providing wireless communications for mobile UE devices 110 and stationary UE devices 125, where that mobile or stationary status of the communication device 110 or 125 is determined and, in turn, the device is authorized and operated using one of a mobile packet core 105 or a stationary packet core 150. For instance, the communication device 700 of FIG. 7 can be used as a mobile UE device 110, as stationary UE device 125, an eNodeB 140, a MME 160, a stationary packet core 150, bearer gateway 170 and 175, a component of an LTE-Uu network 120, and/or a o process or service 185, 195 accessible to the MPC and/or the stationary packet core 150. The communication device 700 of FIG. 7 can the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100 of FIG. 1, as well as communication systems 400-500 of FIGS. 4-5. In addition, the controller 706 can be adapted in various embodiments to perform the functions 462-464 and 572-576, respectively.

Upon reviewing the aforementioned embodiments, it would be evident to an artisan with ordinary skill in the art that said embodiments can be modified, reduced, or enhanced without departing from the scope of the claims described below. For example, the wireless communication system 100 can include eNodeB devices 140 that only support the mobile packet core 105 (GTP tunneling, MME generating authorization protocol message, bearer assignment, updating, etc.,) while not supporting stationary packet core 150. For example, some locations will not have any stationary UE devices 125 and so do not need this facility. In another example, the wireless communication system 100 can include eNodeB devices 140 that only support stationary packet core 150. For example, local loading conditions may dictate that an eNodeB 140 be dedicated to service multiple stationary UE devices 125.

In one or more other embodiments, the eNodeB 140 and the stationary packet core 150 can maintain a TCP/IP session for a stationary packet device 125 beyond a time for uploading packet data from the stationary UE device 125. For example, if the stationary UE device 125 application requires periodic uploads on a frequent basis, such as once every thirty seconds, then the session can left open for subsequent uploads.

In one or more other embodiments, a stationary UE device 125 can include a non-tunneling protocol path that does not require usage of the eNodeB 140. For example, a wired Ethernet link or a wireless link to a gateway router can be provided for the stationary UE device 125. However, it can still be useful for this stationary UE device 125 to upload data through the wireless communication system 100. In this case, the non-tunneling protocol path can be coupled directing to the stationary packet core 125 via a wired, TCP/IP connection from the stationary UE device 125 (or from a networked gateway device) to the stationary packet core 150. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
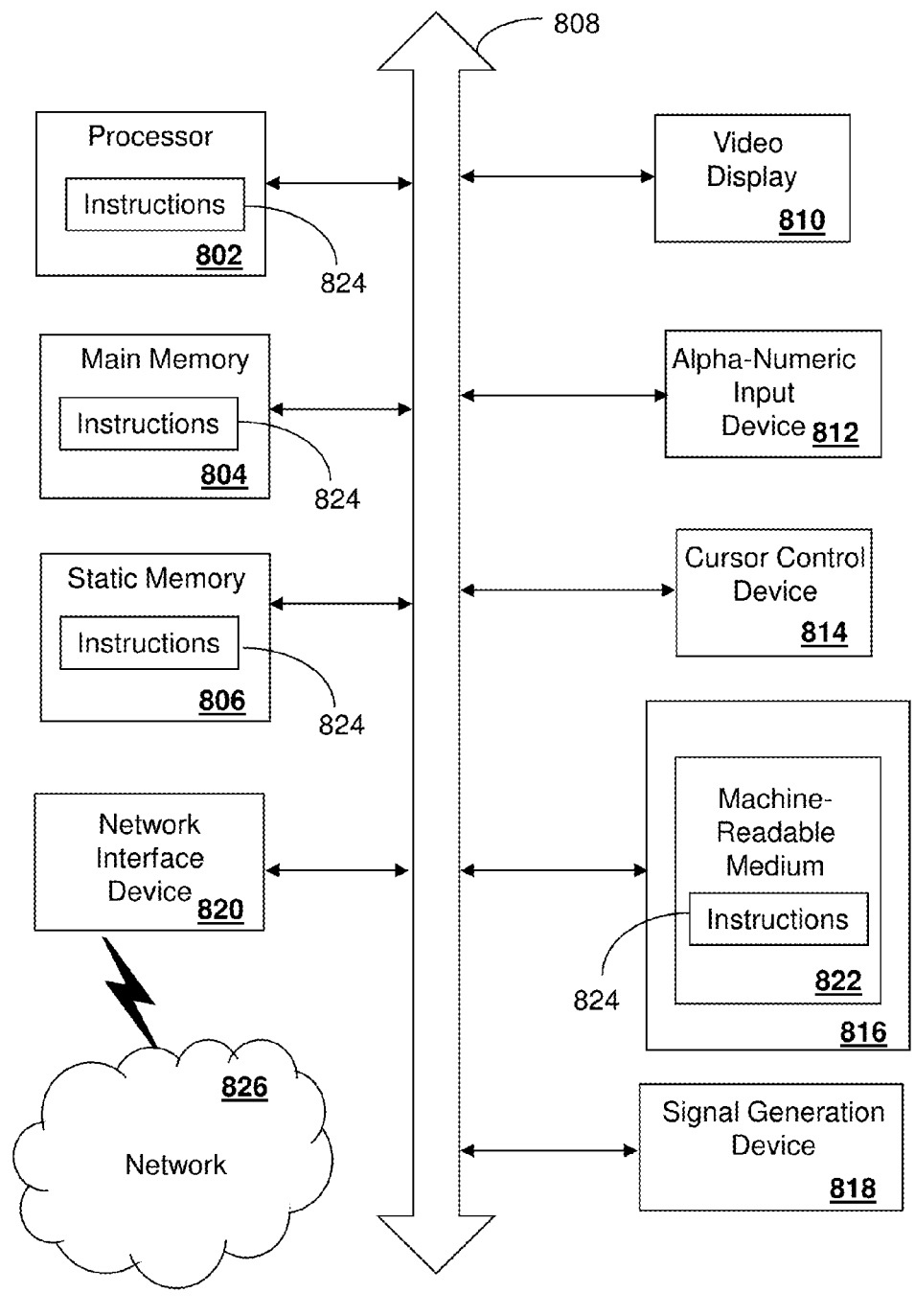
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 430, the media processor 406, a mobile UE device 110, as stationary UE device 125, an eNodeB 140, a MME 160, a stationary packet core 150, bearer gateway 170 and 175, a component of an LTE-Uu network 120, and/or a o process or service 185, 195 accessible to the MPC and/or the stationary packet core 150. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processing system including a processor; and
   a memory that stores executable instructions that, when executed by the processing system, facilitate performance of operations comprising:
      receiving a connection request from user equipment via a wireless link to the user equipment;
      determining a first address of the user equipment from the connection request;
      querying a mobile packet core of a mobile communication network for a second address of a stationary subscriber device of the mobile communication network;
      receiving the second address from the mobile packet core;
      comparing the first address and the second address;
      determining whether the user equipment is mobile or stationary based on the comparing;
      responsive to determining that the user equipment is mobile:
         initiating a tunneling protocol link between the user equipment and mobile management entity of the mobile packet core of the mobile communication network, wherein the mobile management entity assigns a bearer gateway for the user equipment; and
         transmitting first packet data from the user equipment to a first service through the bearer gateway via the tunneling protocol link; and
      responsive to determining that the user equipment is stationary:
         initiating a non-tunneling link between the user equipment and a stationary packet core of the mobile communication network;
         transmitting an authentication protocol message to an authentication server via the stationary packet core and converting the connection request from a Non-Access Stratum protocol to an authentication protocol responsive to initiating the non-tunneling link; and
         transmitting second packet data from the user equipment to a second service through the stationary packet core via the non-tunneling link.

2. The device of claim 1, wherein the operations further comprise: transmitting an authentication request to the mobile management entity responsive to initiating the tunneling protocol link.

3. The device of claim 2, wherein the mobile management entity sends a mobile authentication protocol message to the authentication server.

4. The device of claim 1, wherein the non-tunneling link comprises a TCP/IP link.

5. The device of claim 1, wherein the operations further comprise closing the non-tunneling link responsive to transmitting the second packet data.

6. The device of claim 1, wherein the stationary packet core stores an authentication state for the user equipment.

7. The device of claim 1, wherein the mobile management entity maintains assignment of the bearer gateway responsive to transmitting of the first packet data.

8. The device of claim 1, wherein the second service is hosted at a mobile device.

9. The device of claim 1, wherein the second service is hosted at a server device.

10. The device of claim 1, wherein the stationary packet core comprises a router.

11. The device of claim 1, wherein operations further comprise:
   determining whether the user equipment is not authenticated, responsive to initiating the non-tunneling link; and
   authenticating the user equipment via the stationary packet core responsive to determining that the user equipment is not authenticated.

12. The device of claim 1, wherein the mobile management entity updates the bearer gateway responsive to a location change for the user equipment.

13. A computer-readable storage device comprising executable instructions which, responsive to being executed by a processor, facilitate performance of operations comprising:
   determining a first address of a user equipment from a connection request;
   querying a mobile packet core of a mobile communication network for a second address of a stationary subscriber device of the mobile communication network;
   receiving the second address from the mobile packet core;
   comparing the first address and the second address;
   determining whether the user equipment is mobile or stationary based on the comparing; and
   responsive to determining that the user equipment is stationary:
      initiating a TCP/IP link between the user equipment and a stationary packet core of the mobile communication network;
      transmitting an authentication protocol message to an authentication server via the stationary packet core and converting the connection request of the user equipment from a Non-Access Stratum protocol to an authentication protocol of the authentication protocol message responsive to initiating the TCP/IP link; and
      transmitting packet data from the user equipment to a service through the stationary packet core via the TCP/IP link.

14. The computer-readable storage device of claim 13, wherein, responsive to determining that the user equipment is mobile, initiating a tunneling protocol link between the user equipment and a mobile management entity of the mobile packet core of the mobile communication network.

15. The computer-readable storage device of claim 14, wherein, the mobile management entity assigns a bearer gateway for the user equipment.

16. The computer-readable storage device of claim 13, wherein the operations further comprise closing the TCP/IP link responsive to transmitting the packet data.

17. The computer-readable storage device of claim 15, wherein, responsive to determining that the user equipment is mobile, the operations further comprise transmitting second packet data from the user equipment to a second service through the bearer gateway via the tunneling protocol link.

18. A method, comprising:
   initiating, by a processing system including a processor, a third generation partnership project link between a user equipment and a mobile management entity of a mobile packet core of a mobile communication network;
   determining, by the processing system, a first address of the user equipment from a connection request;
   receiving, by the processing system, second addresses of stationary subscriber devices located in an area supported by the processing system from the mobile packet core of the mobile communication network;
   comparing, by the processing system, the first address and the second addresses;
   identifying, by the processing system, that the user equipment is stationary based on the comparing;
   initiating, by the processing system, a non-tunneling link between the user equipment and a stationary packet core of the mobile communication network, based on identifying that the user equipment is stationary;
   converting the connection request from a Non-Access Stratum protocol to an authentication protocol responsive to initiating the non-tunneling link; and
   transmitting, by the processing system, packet data from the user equipment to a service through the stationary packet core via the non-tunneling link.

19. The method of claim 18, wherein each secondary address of the second addresses is received when a service plan has been contracted for a corresponding stationary subscriber device of the stationary subscriber devices.

20. The method of claim 18, wherein the non-tunneling link comprises a TCP/IP link.

* * * * *